United States Patent [19]

Halterman, Jr.

[11] Patent Number: 5,216,831

[45] Date of Patent: Jun. 8, 1993

[54] REMOVABLE, REUSABLE, STRIKE INDICATOR FOR FISHING

[76] Inventor: Danny R. Halterman, Jr., Rte. 1, Box 27, Eureka Springs, Ark. 72632

[21] Appl. No.: 795,973

[22] Filed: Nov. 22, 1991

[51] Int. Cl.$^5$ .............................................. A01K 91/00
[52] U.S. Cl. .................... 43/44.91; 43/44.92
[58] Field of Search .................. 43/44.87, 44.9, 44.91, 43/44.92, 44.94, 44.95

[56] References Cited

U.S. PATENT DOCUMENTS

| | | | |
|---|---|---|---|
| 2,784,518 | 3/1957 | Boyer | 43/44.91 |
| 2,874,511 | 2/1959 | Hettrick | 43/44.87 |
| 3,744,176 | 7/1973 | Bondhus . | |
| 3,808,728 | 5/1974 | Ratte | 43/43.91 |
| 3,955,305 | 5/1976 | Roberts | 43/44.91 |

FOREIGN PATENT DOCUMENTS 0236996  2/1959  Australia ............................ 43/44.91

*Primary Examiner*—Richard K. Seidel
*Assistant Examiner*—James Miner
*Attorney, Agent, or Firm*—Stephen D. Carver

[57] ABSTRACT

A reusable strike indicator (10) of size and weight to be useful in fly fishing, ice fishing and light bait fishing, which provides slippage resistant attachment along a static fishing line (L) at a selected position of adjustment. The strike indicator comprises a suitable shape 11 that is bifurcated (12) to create opposing surfaces which are resiliently held in rotationally interlocking contact by an elongate, dumbbell shaped, stretchable tab (20), slightly shorter in length than the strike indicator, which is inserted through the lumen of an axial bore (14) in the strike indicator [shape] (10). The ends of the stretchable tab (20) are affixed into recesses (18), one at each end of the strike indicator. The fishing line 30 passes through a longitudinal slit (16) in the strike indicator (10) into the lumen of the bore (14); wherein, the strike indicator (10) is separated axially outward and the stretchable tab (20) is twisted around the fishing line 30. The fishing line is thus frictionally clamped to the complete strike indicator when the opposing surfaces are resiliently returned to rotationally interlocking contact.

15 Claims, 2 Drawing Sheets

REMOVABLE, REUSABLE, STRIKE INDICATOR FOR FISHING

BACKGROUND OF THE INVENTION

1. Field of Invention

This invention relates primarily to strike indicators and fishing floats, specifically to such strike indicators as are used in fly fishing and ice fishing, or any form of fishing where a small, lightweight fishing float or strike indicator is desirable.

2. Description of the Prior Art

The fly fishing portion of the fishing sport specializes in using very small and lightweight flies and lures. Fly fishing requires the angler to cast a relatively heavy line to assist in carrying the fly or lure to the water. This contrasts to the sport of spin or bait casting, which requires the angler to use a delicate, lightweight line attached to a heavy lure or bait for casting.

There are many types of floating strike indicators and fishing floats, sometimes called "bobbers." Most of them are too heavy to be useful in fly fishing and have their broadest range of application in spin and bait casting where their weight can enhance the ability to cast. However, since the use of a fishing, float or strike indicator is important in all forms of fishing, including fly fishing, to assist in detecting the lightest strike of a fish, it is essential that such strike indicators be as light as possible for the fly fisher to be able to cast them. In addition, such very small and lightweight strike indicators are beneficial in some types of bait fishing, including ice fishing, where the strike of a fish may be very light and most easily detected with such a strike indicator.

Heretofore, such lightweight strike indicators have been of two categories: floating and non-floating. Non-floating strike indicators have ranged from small pieces of colorful tape rolled around the fishing line, to small segments of tubular plastic, such as wiring insulation, which has been threaded onto the fishing line. It is frequently essential to fish in water that is deep or not clear enough to see the strike indicator when submerged. It is obvious that these non-floating strike indicators are useful only in shallow or very clear water.

Sticky tape can be messy and leave adhesive on the fishing line when removed and is not reusable. Tubular plastic requires that the flies, lures, hooks, sinkers, or snaps be removed from the terminal end of the fishing line for attachment or removal. Such maneuvers can be awkward and time consuming at streamside.

Specifically, two types of lightweight, floating strike indicators have received widest acceptance in fly fishing. They both have the advantages of being floating devices and sufficiently lightweight enough to cast with conventional fly casting equipment. One type is an adhesive-backed foam which is pinched or rolled onto the fishing line at the desired location. While this has the advantage of being lightweight and soft, it is not reusable and leaves a sticky residue on the fishing line and frequently a pocketful of used, sticky, pieces of foam. If they become wet during installation, a common occurrence, they are frequently ruined and will not stick to the fishing line. The discarded pieces are frequently left on the ground by indiscriminate anglers.

The other type of strike indicator in common use is made of polystyrene foam, wood, cork, or other rigid material with a specific density less than water. It is generally a small, symmetrically smooth shape, about a half-inch long and a quarter-inch in diameter. These strike indicators have a bore through their long axis. One type of installation is achieved by either running the terminal end of the fishing line through the bore or slipping the fishing line through a slit in the side and thus into the bore. The latter permits placement along a static line; that is, without removing the fly or lure and weight from the terminal end of the fishing line. Both of these strike indicators require that a toothpick-type device be wedged into the bore to clamp the strike indicators to the fishing line so that it won't slip.

There are several disadvantages to these installations. The toothpick/strike indicator type of installation utilizes two separate parts. Of course, loss of either will render this type of strike indicator installation impossible. In addition, the clamping between the hard and abrasive surfaces will frequently damage delicate fishing line. It is not unusual for the jamming action of the toothpick device to cause the strike indicator to split into two pieces, thus rendering the strike indicator useless. This is especially prone to occur if the strike indicator is of the type with a slit to facilitate fishing line placement.

Another type of installation is achieved by looping the strike indicator onto the fishing line. This is accomplished by passing a loop of fishing line through the bore and then running the terminal end of the fishing line through the loop and pulling tightly. The loop connection will always cause the fishing line to permanently kink and be damaged at the point to which it is applied. In addition, if the fishing line is pulled tightly, as when the lure or fly is hung on a rock or tree, the tight loop will damage or ruin the strike indicator, generally rendering the fishing line and strike indicator useless.

One additional device which has been used in fishing and has relevance to the placement of a fishing float onto a fishing line is U.S. Pat. No. 3,744,176 to Bondhus in 1973, which discloses a float which has been widely used with spin and bait casting equipment. The weight of the float and water it may contain make it possible to cast very small flies and lures with equipment that was designed for spin and bait casting. This fishing float has no application in fly fishing and also has a major disadvantage to any angler. The lure or fly and weight must be removed from the terminal end of the fishing line for attachment or removal, as in the tubular plastic mentioned above.

As a result of the personal creativity of many fly fishing anglers in pursuit of their sport, there may be other forms of strike indicator's in use of which I am not aware. However, of the many with which I am familiar, all of the strike indicators heretofore known suffer from a number of disadvantages:

(a) Adhesive backed tapes and foams are difficult to remove from the fishing line, leave a sticky residue on the fishing line, and are not reusable, thus requiring that they be placed in a pocket or thrown into the envionment. In addition, adhesive-backed foams must be kept dry during installation, a task which is difficult at best while fishing, especially in rainy weather. Even when successfully installed dry, They will frequently slip or simply not stick to the fishing line, causing loss of time and inconvenience.

(b) Many strike indicators require that the terminal end of the fishing line be threaded through the axial bore of the indicator for installation. To install these indicators requires that the fly or lure and weight be removed from the terminal end of the fishing line before installation is possible. In fly fishing, it is frequently necessary to change fishing strategies many times throughout the course of a fishing day. It is very inconvenient and time consuming to change strike indicators in this manner.

(c) Strike indicators with an axial bore require that a toothpick device be wedged into the axial bore with the fishing line to clamp the line into place or that a loop-type connection be used, as described above. Either method will damage the fishing line and/or strike indicator. If the toothpick device swells while in the water with the strike indicator, removal is frequently difficult or impossible. If the toothpick device is pressed into place too firmly, the strike indicator will frequently split into two pieces. If the toothpick device is lost, the strike indicator may be rendered useless.

(d) Strike indicators with an axial bore, which also have a slit through them from the surface to the axial bore, do facilitate fishing line installation, but have the same disadvantages as the indicators listed in (c) above, but tend to split more easily when the toothpick device is pressed into place. In addition, If the toothpick device should be lost from the installation while fishing, the strike indicator will be easily lost because the fishing line can slip through the slit in the side of the strike indicator.

(e) Non-floating strike indicators, such as tubular plastic, can be difficult to install, and unusable in deep or less than very clear water where they can't be seen.

(f) Strike indicators or fishing floats which are used in spin or bait casting are too heavy, large, or bulky to be usable in fly casting. Such strike indicators are also generally not sensitive to the light strikes experienced in fly fishing and some bait fishing techniques, such as ice fishing.

As can be seen from the foregoing discussion, an invention has been needed which would make the use of strike indicators and small fishing floats more efficient and convenient. My invention has provided those qualities. My invention has heretofore evaded discovery primarily due to the strong tendencies of fly fishers to follow traditional lines of thought, sometimes to their disadvantage.

OBJECTS AND ADVANTAGES

Accordingly, the present invention has several objects and advantages:

(a) to provide a strike indicator of size and weight to be useful in fly fishing, ice fishing, and other forms of fishing which require lightweight, sensitive strike indicators;

(b) to provide a strike indicator which requires minimal time for manipulation, which can be easily installed and removed, or moved up or down a static fishing line; that is, with the terminal end of the fishing line remaining attached to the lure, fly, or weight;

(c) to provide a strike indicator which does not require the use of adhesive tapes or foams;

(d) to provide a strike indicator which can be frictionally clamped to the line without damaging the line and which will not slip on the line;

(e) to provide a strike indicator which functions as one piece, not requiring a toothpick device or other separate parts for installation;

(f) to provide a strike indicator which can be easily reused, minimizing the throw-away nature of currently used strike indicators;

(g) to provide a strike indicator which can be installed reliably with wet hands or in wet weather;

These and other objects and advantages of the present invention, along with features of novelty appurtenant thereto, will appear or become apparent in the course of the following descriptive sections.

BRIEF DESCRIPTION OF THE DRAWING FIGURES

DETAILED DESCRIPTION

Figure 1:
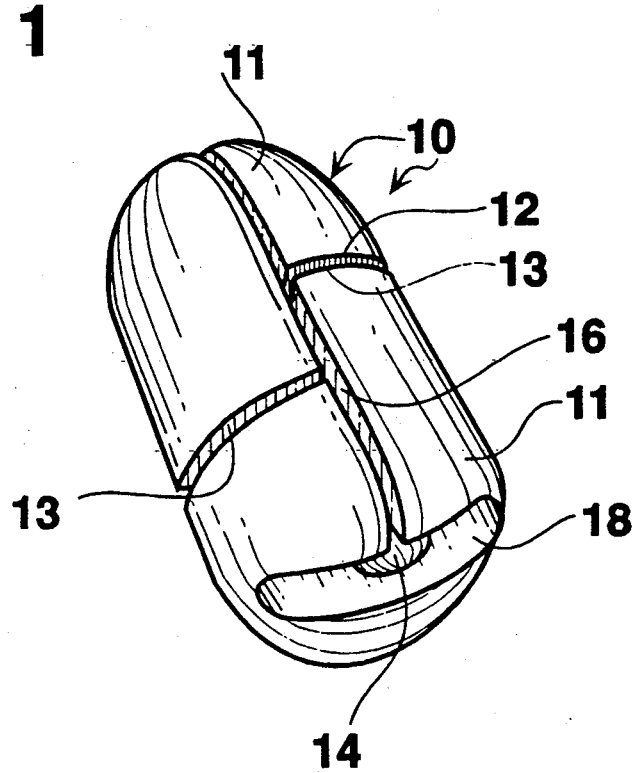
FIG. 1 shows a perspective view of the top of the strike indicator.
Figure 2:
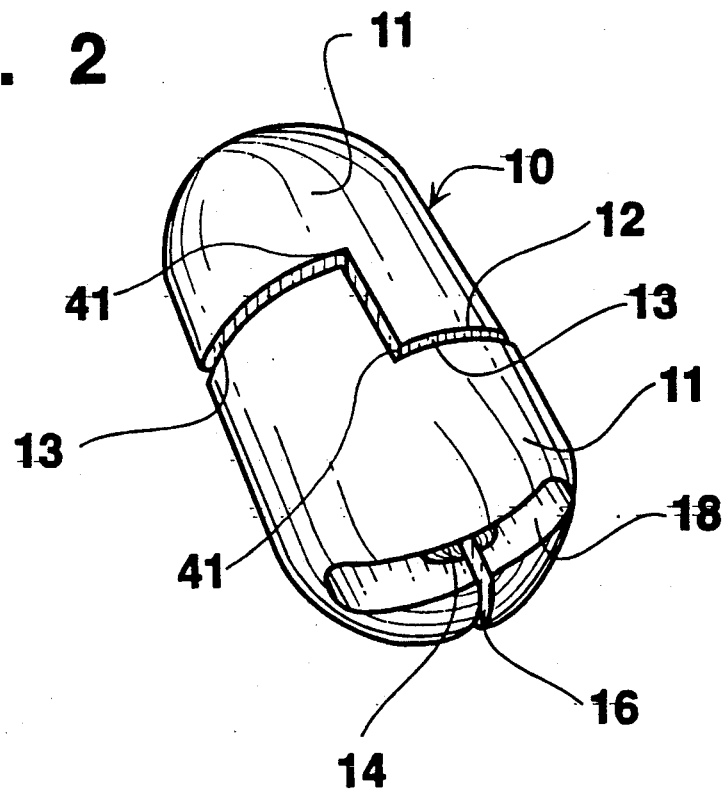
FIG. 2 shows a perspective view of the bottom of the strike indicator.

A typical embodiment of the strike indicator of the present invention is illustrated in FIG. 1 and FIG. 2. The material from which the strike indicator is manufactured can be any lightweight, rigid material which for a given size and shape would function for its intended fishing use. The typical, floating strike indicator, which the illustration depicts, is manufactured with injectable polystyrene foam, using typical micro-molding techniques as can be obtained through several suppliers of such products; for example, AE Products, Inc., of Iola, Wis.

The strike indicator body 10 depicted in FIG. 1 and FIG. 2 is in actuality the assemblage of two identical segments 10A and 10B which placed together as illustrated form a generally prolate shape 11 with a bifurcation 12 that creates opposing axial surfaces 13 and horizontal surfaces 13A in rotationally interlocking contact. Each segment 10A and 10B comprises a minor portion 10C and an integral, major portion 10D. When the body is fitted together, the major portion 10D of each segment will contact the minor portion 10C of the companion segment. An axial bore 14 passes throughout the long axis of the strike indicator body 10 with an opening on each end of the strike indicator body 10. A slit 16 is present from the top exterior surface of the strike indicator body 10 to intersection with the lumen of the axial bore 14 along its entire length. A recess 18 is present in each end of the strike indicator body 10. The recess 18 is formed transverse and sagitally to the axial bore 14 and at a right angle to the slit 16. In other words, the recesses 18 are centered on and perpendicular to the central axis of the axial bore 14.

A notch 41 (FIG. 2) is formed between the intersecting surfaces 13 and 13A. When the body segments are coupled together, each notch rotationally and axially abuts a portion of the companion segment.

The strike indicator body 10 as depicted in FIG. 1 and FIG. 2 is typically 0.650 inch in length by 0.350 inch in diameter. The axial bore 14 is typically 0.065 inch in diameter. The slit 16 is typically 0.020 to 0.028 inch in width. the recess 18 is typically 0.050 inch deep by 0.030 inch wide and the greatest dimension is determined by the curvature of the end of the strike indicator body 10.

Figure 3:
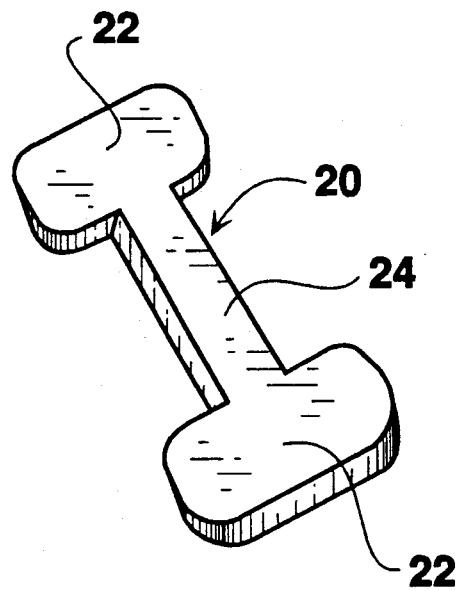
FIG. 3 shows a perspective view of the dumbbell shaped, stretchable tab.

A typical embodiment of the dumbbell shaped stretchable tab 20 is illustrated in FIG. 3. The stretchable tab 20 is typically manufactured from gum rubber and is die stamped. It can be obtained by special order from many rubber fabricators, such as Western Rubber and Supply of Hayward, Calif.

The stretchable tab 20 as illustrated in FIG. 3 is typically 0.500 inch in greatest length by 0.250 inch wide in greatest width by 0.040 inch thick. The inside length of the stretchable tab 20, between the dumbbell shaped ends 22, is typically 0.250 inch. The typical width of the stretchable tab 24, between the dumbbell shaped ends 22, is 0.060 inch.

Figure 5:
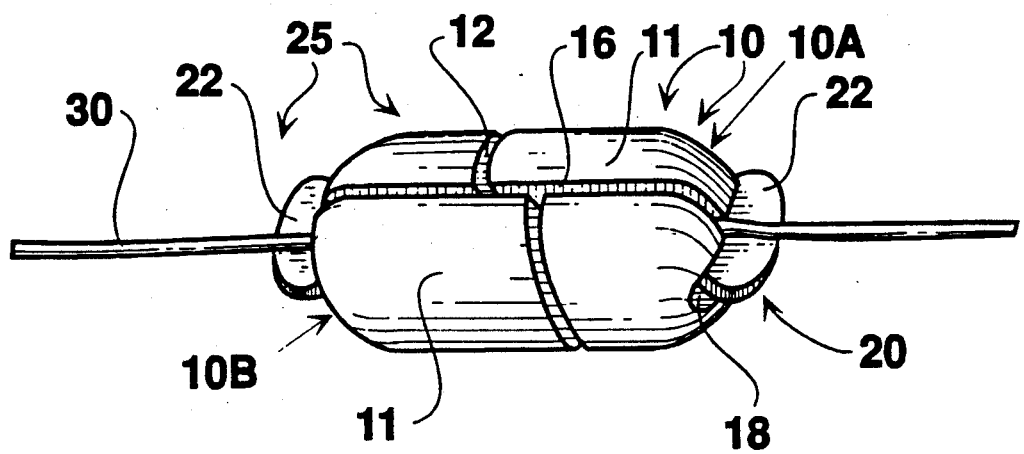

FIG. 5 is a perspective view which shows the complete strike indicator 25, stretchable tab 20 in place, and the fishing line 30 installed. It can be seen in this view that the dumbbell shaped end 22 of the stretchable tab 20 is nestled into the recess 18 at each end of the strike indicator body 10. The stretchable tab 20 extends through the axial bore 14 (FIGS. 1 and 2).

FIGS. 1, 2, 3, and 5, are illustrations of only one embodiment of this invention. There exists a broad range of sizes, shapes, and weights which can be created using this invention to match a broad range of fishing conditions, including larger versions for spin and bait fishing. In addition, there are many, if not infinite, configurations of the rotationally interlocking contact mechanism. On larger and longer fishing floats, it is possible to provide two such rotationally interlocking contacts to insure reliable placement on the fishing line.

From the description above, a number of advantages of my strike indicator become evident:

(a) the strike indicator can be easily installed and removed, or moved up or down a static fishing line; that is, with the terminal end of the fishing line remaining attached to the lure or fly and weight;

(b) Frictional clamping of the strike indicator to the fishing line is achieved such that it will not slip on the fishing line and will not damage the fishing line;

(c) the strike indicator functions as a one-piece unit, without the need for a toothpick type device to hold it onto the fishing line;

(d) the installation of the strike indicator is easily achieved with wet hands or in wet weather;

(e) the strike indicator is reusable many times, thus minimizing the impact on the environment of throw-away strike indicators;

(f) a broad range of fishing floats and strike indicators can be created using this invention to match a broad range of fishing conditions, including spin and bait fishing.

Operation

Figure 4:
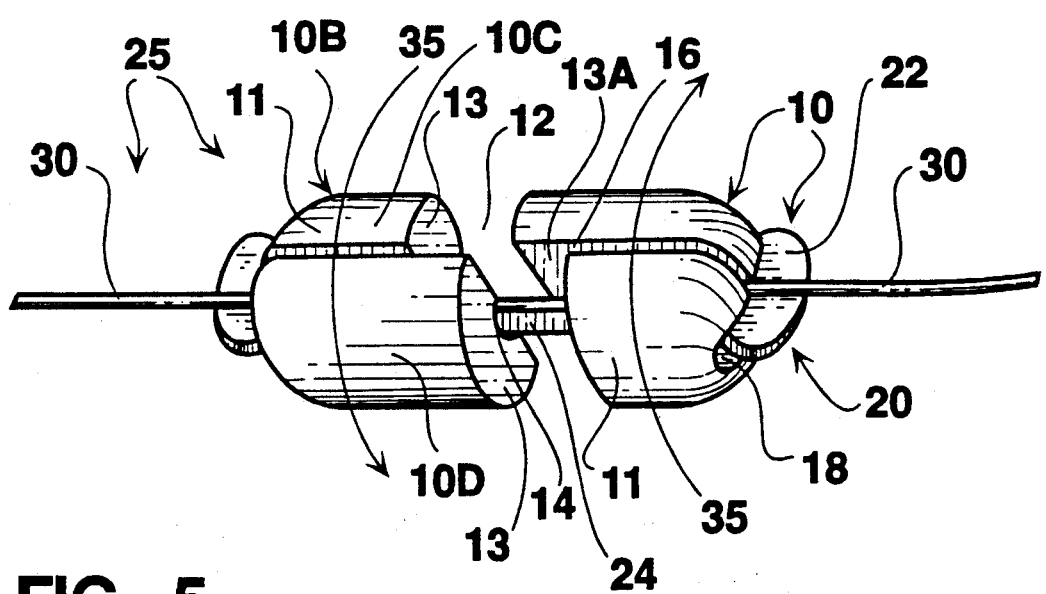
FIG. 4 shows the installation of the strike indicator shape onto a fishing line with axially outward separation of the interlocking surfaces; and, FIG. 5 shows the strike indicator installed upon a fishing line with the interlocking opposing surfaces in rotationally interlocking contact.

One method of installing the strike indicator 25 onto a fishing line is illustrated in FIG. 4. Specifically, a fishing line 30 is placed into the slit 16 and moved into the axial bore 14. By then grasping the strike indicator body segments 10A, 10B between the thumb and forefinger of each hand, the strike indicator body 10 can be separated outwardly at the bifurcation 12. This maneuver permits axial separation of the opposing surfaces 13 and the opposing horizontal surfaces 13A thus facilitating inactivation of the rotationally interlocking contact mechanism. By then following the arrows 35 in FIG. 4 depicting independent rotation of each segment 11 of the strike indicator body 10, the stretchable tab 20 is twisted around the fishing line 30. When the opposing surfaces 13 at the bifurcation 12 are then resiliently moved back into rotationally interlocking contact, the strike indicator 25 is frictionally clamped to the fishing line 30.

Removal of the fishing line 30 from the strike indicator 25 is simply the reversal of the installation procedure.

Accordingly, the reader will see that the strike indicator is easily installed, removed, and stored for reuse. It can be easily placed at any location along a static fishing line without access to the terminal ends of the fishing line. That means that the fly or lure and weight can remain attached. There are no hard or abrasive surfaces to damage delicate fishing lines and the frictional clamping will provide a non-slip installation. Furthermore, the strike indicators of this invention have the additional advantages in that the strike indicators can be made in a broad range of sizes, shapes, and weights to match an equally broad range of fishing conditions and styles, including spin and bait fishing;

the installation of the strike indicator can be achieved with wet hands and in wet weather with no inconvenience;

since the strike indicators are reusable many times, there will be minimal impact on the environment;

There are no separate parts to be lost or ruined which could render the strike indicator useless.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

Although the description above contains many specificities, these should not be construed as limiting the scope of the invention but as merely providing illustrations of some of the presently preferred embodiments of this invention. For example, the strike indicator body can be conical, prolate, spherical, barrel, circular, cylindrical, etc.; the strike indicator body can be made in a broad range of sizes and weights to match the fishing requirements. The strike indicator body can be made out of any material which will meet the requirements of the application such as wood, plastic, cork, etc. The necessary bifurcations, slits, and recesses are easily cut with a bandsaw and fine blade.

In addition, there are other applications for my invention; that is, a device that will frictionally clamp onto a line or rope. A cord lock which stops the sliding of an object on a line or rope might be created using this invention. As a means to prevent the slippage of a rope or line into a small recess where it would not be easily retrieved is also a potential application. This invention could also be used to mark a reference length or distance on a line or rope.

While one embodiment has been described in detail, it will be apparent to those skilled in the art that the disclosed embodiment may be modified. Thus the scope of the invention should be determined by the appended claims and their legal equivalents, rather than by the examples given.

As many possible embodiments may be made of the invention without departing from the scope thereof, it is to be understood that all matter herein set forth or shown in the accompanying drawings is to be interpreted as illustrative and not in a limiting sense.

What is claimed is:

1. A reusable strike indicator for fishing, said strike indicator comprising:

a bifurcated body adapted to be removably attached to a fish line, said body comprised of cooperating segments adapted to be fitted together in rotationally interlocking contact to form the body, each segment comprising notch means for interlocking with the opposite segment;

an axial bore defined through said body;

an elongated slit defined through said body and intersecting said bore into which the fishing line is inserted;

stretchable tab means having an unstretched length slightly shorter than the length of said bore and disposed within said bore for yieldably biasing the segments together in rotationally interlocking contact and for twistable, frictional engagement with a line that has been received within said slit to frictionally clamp said strike indicator to said line at a selected position.

2. The strike indicator as defined in claim 1 wherein each segment comprises a minor body portion terminating in a first axial surface and a major body portion defining a horizontal surface and terminating in a second axial surface, said notch means defined between said first axial surface and said horizontal surface.

3. The strike indicator as defined in claim 1 wherein said tab means is generally dumbbell shaped and comprises transverse ends.

4. The strike indicator as defined in claim 3 wherein a recess is defined at each end of said body transversely with respect to said bore and at right angle to said slit for receiving said tab means ends.

5. The strike indicator of claim 1 wherein said body is made of polystyrene foam.

6. The strike indicator of claim 1 wherein said body is made of wood.

7. The strike indicator of claim 1 wherein said body is made of cork.

8. The strike indicator of claim 1 wherein said body is made of plastic.

9. A reusable strike indicator for fly fishing, said strike indicator comprising:

a two piece body adapted to be removably attached to a fish line, said body comprised of identical cooperating segments adapted to be fitted together in rotationally interlocking contact to form the body, each segment comprising means for interlocking with the opposite segment;

an axial bore defined through said body;

an elongated slit defined through said body and intersecting said bore into which the fishing line is inserted;

resilient tab means having an unstretched length slightly shorter than the length of said bore and disposed within said bore for yieldably biasing the segments together in rotationally interlocking contact, and for frictionally engaging with a line that has been received within slit to yieldably fasten said strike indicator to said line at a selected user adjustable position.

10. The strike indicator as defined in claim 9 wherein each segment comprises a minor body portion terminating in a first axial surface and a major body portion defining a horizontal surface and terminating in a second axial surface, said notch means defined between said first axial surface and said horizontal surface.

11. The strike indicator as defined in claim 9 wherein:
said tab means is generally dumbbell shaped and comprises transverse ends; and,
a recess is defined at each end of said body transversely with respect to said bore and at right angle to said slit for receiving said tab means ends.

12. The strike indicator of claim 11 wherein said body is made of polystyrene foam.

13. The strike indicator of claim 11 wherein said body is made of wood.

14. The strike indicator of claim 11 wherein said body is made of cork.

15. The strike indicator of claim 11 wherein said body is made of plastic.

* * * * *